United States Patent [19]

Honda et al.

[11] Patent Number: 4,946,534

[45] Date of Patent: Aug. 7, 1990

[54] PROCESS FOR THE PREPARATION OF MAGNETIC RECORDING DISK

[75] Inventors: Kunihiko Honda; Tadashi Ishiguro; Masaaki Fujiyama, all of Kanagawa, Japan

[73] Assignee: Fuji Photo Film Co., Ltd., Kanagawa, Japan

[21] Appl. No.: 183,804

[22] Filed: Apr. 20, 1988

[30] Foreign Application Priority Data

Apr. 20, 1987 [JP] Japan .................................. 62-96817

[51] Int. Cl.$^5$ ...................... B32B 31/04; B32B 31/18
[52] U.S. Cl. ...................................... 156/261; 29/447; 29/448; 29/DIG. 21; 156/293; 156/303.1
[58] Field of Search ................... 360/98, 135; 428/900, 428/910, 694, 64, 65; 29/447, 448, DIG. 21; 156/293, 297, 84, 303.1, 275.1, 229, 261; 269/54.5, 47

[56] References Cited

U.S. PATENT DOCUMENTS

| | | | |
|---|---|---|---|
| 3,462,817 | 8/1969 | Horsfall | 360/135 |
| 3,599,226 | 8/1971 | Lipps | 360/135 |
| 4,014,968 | 3/1977 | Simon | 428/65 |
| 4,480,282 | 10/1984 | Brock | 360/135 |
| 4,549,922 | 10/1985 | Oishi | 156/297 |
| 4,698,715 | 10/1987 | Oishi | 360/135 |
| 4,710,913 | 12/1987 | Matsushima | 428/65 |
| 4,729,805 | 3/1988 | Alexander | 156/275.1 |
| 4,761,874 | 8/1988 | Utsui | 360/135 |

*Primary Examiner*—Merrell C. Cashion, Jr.

[57] ABSTRACT

A process for the preparation of a magnetic recording disk comprises the steps of providing a magnetic recording layer on a surface of a nonmagnetic support, punching the nonmagnetic support together with the magnetic recording layer into a disk having a circular hole in its central portion, and fitting mechanical members including a center core made of a synthetic resin into the hole of the support. The nonmagnetic support having the magnetic recording layer and at least the center core of the mechanical members are subjected to heat treatment independently prior to fitting the mechanical members including the center core into the hole of the support.

4 Claims, No Drawings

PROCESS FOR THE PREPARATION OF MAGNETIC RECORDING DISK

BACKGROUND OF THE INVENTION

1. Field of the Invention

The present invention relates to a process for the preparation of a magnetic recording disk, more particularly to a magnetic recording disk provided with a center core in the central portion.

2. Description of Prior Art

A magnetic recording disk (i.e., magnetic recording medium in the form of a disk) of a relatively small size has been recently developed as a video floppy disk.

The magnetic recording disk comprises a nonmagnetic support and a magnetic recording layer provided thereon. In the case of a magnetic recording disk provided with a center core in the central portion, a synthetic resin is generally employed as a material of the nonmagnetic support and the center core. Such synthetic resin has an advantage of a moderate flexibility but has a defect with respect to heat shrinkage which brings about a dimensional change of the resulting disk. In detail, the heat shrinkage of the synthetic resin means an irreversible dimensional change of a magnetic recording medium which is observed when the medium is employed, stored or transferred in an atmosphere of high temperatures.

If the dimensional change of the magnetic recording medium takes place between the recording procedure and the reproducing procedure, the recording medium suffers a phenomenon of so-called "tracking deviation" in the reproduction procedure to cause lowering of reproduction output, and in an extreme case, the reproduction operation cannot be carried out.

For avoiding such heat shrinkage of the synthetic resin, it has been proposed to beforehand subject the support to heat treatment to reduce the heat shrinkage ratio of the support and then prepare a magnetic recording medium using thus heat-treated support or to subject a web of continuous length for the preparation of a magnetic recording medium to a heat treatment in the preparation of the medium (i.e., before or after the procedure of coating a magnetic paint over the support). For the same purpose, it has been also proposed to subject a web roll of continuous length to a heat treatment in its roll state.

However, the above-mentioned proposals still remain various problems. For example, in the case of heating a web of continous length, the heat shrinkage can be reduced in the width direction but can be hardly reduced in the longitudinal direction. Also in the case of heating a web roll of continuous length, the heat shrinkage in the longtudinal direction can be hardly restrained, and additionally a difference of the heat shrinkage is produced between in an outer part of the roll and in an inner part near the center of the roll because of the difference of internal pressure therebetween.

As a measure for improving the above-mentioned methods, Japanese Patent Provisional Publication No. 59(1984)-12733 describes that the web roll is initially cut to give a support in the form of sheet and then plural sheets in the superposed form are heated to reduce the heat shrinkage thereof. This measure can serve to reduce the heat shrinkage in the case of, for example, a floppy disk of 8 inch or 5 inch which is not provided with a center core in its central portion. However, in the case of a floppy disk provided with a center core made of a synthetic resin (e.g., a video floppy disk), the center core having been subjected to no heat treatment still suffers from heat shrinkage. Therefore, this measure does not appear to be satifactory.

SUMMARY OF THE INVENTION

It is an object of the present invention to provide a process for the preparation of an improved magnetic recording disk provided with a center core of a synthetic resin in the central portion.

Particularly, the invention provides a process for the preparation of a magnetic recording disk provided with a center core which is improved in the dimensional stability.

There is provided by the present invention a process for the preparation of a magnetic recording disk comprising the steps of providing a magnetic recording layer on a surface of a nonmagnetic support, punching the nonmagnetic support together with the magnetic recording layer into a disk having a circular hole in the central portion, and fitting mechanical members including a center core made of a synthetic resin into the hole of the support, which is characterized in that the nonmagnetic support having the magnetic recording layer and at least the center core among the mechanical members are subjected to a heat treatment independently prior to fitting the mechanical members including the center core into the hole of the support.

The mechanical members to be fitted to the medium sheet (i.e., nonmagnetic support with a magnetic recording layer having been punched into a disk) mainly comprises a center core, an upper core and a double-sided adhesive ring, and they have the following function in the case of a video floppy disk (means herein a magnetic recording disk provided with mechanical members such as a center core, etc.). For example, the center core serves to fix the video floppy disk to a rotation axis and to smoothly rotate the floppy disk in the recording procedure and the reproduction procedure. For this reason, when the mechanical members are different from the medium sheet in the heat shrinkage characteristics, a phenomenon of tracking deviation or deterioration of skew property easily takes place in the rotation of the resulting video disk.

In the process for the preparation of a magnetic recording disk according to the present invention, the medium sheet and at least the center core among the mechanical members are independently subjected to a heat treatment so as to remarkably reduce difference of the heat shrinkage between the mechanical members (including the center core) and the medium sheet. As a result, the obtained magnetic recording disk such as a video floppy disk can be improved in the tracking deviation and the skew property without lowering the surface smoothness even when the disk is employed, stored or transferred in an atmosphere of a high temperature or an atmosphere of a high temperature and a high humidity.

The reason is thought that the nonmagnetic support having been punched into a disk and the mechanical members including the center core are not influenced from each other with respect to the heat shrinkage in the case of heating each part separately, so that the heat shrinkage ratio of the resulting disk can be much more reduced than the case of heating the whole parts after fitting the mechanical members to the support.

DETAILED DESCRIPTION OF THE INVENTION

A magnetic recording medium can be generally prepared by a process comprising the steps of coating a magnetic paint over a nonmagnetic support, then subjecting the resulting sheet to various treatments such as magnetic orientation, curing treatment and surface smoothening treatment, if desired, and cutting the sheet into a desired shape.

The process for the preparation of a magnetic recording disk provided with a center core according to the present invention will be described in detail hereinafer.

In the first place, a magnetic recording layer is formed on a nonmagnetic support.

The nonmagnetic support may be in the form of a roll of continuous length or may be in the form of a sheet produced by cutting the roll. The nonmagnetic support may be beforehand subjected to a heat treatment.

The nonmagnetic support can be selected from films or sheets of synthetic resins such as polyester resins (e.g., polyethylene terephthalate (PET) and polyethylene naphthalate), polyolefin resins (e.g., polypropylene), cellulose derivatives (e.g., cellulose diacetate and cellulose triacetate), vinyl resins (e.g., polyvinyl chloride and polyvinylidene chloride), polycarbonate, polyamide, polyamideimide, and polyimide; nonmagnetic metallic foils such as aluminum foil and copper foil; metallic foils such as stainless steel foil; ordinary papers; and ceramic sheets. The thickness of the nonmagnetic support is preferably in the range of 10 to 55 $\mu$m.

The magnetic recording layer comprises a binder and a particulate component such as a ferromagnetic powder dispersed in the binder. The binder comprises a resin component, and if desired, a curing agent.

The magnetic recording layer can be formed on the nonmagnetic support by a conventional method. For example, a resin component, a ferromagnetic powder and, if necessary, other additives such as an abrasive and a curing agent are kneaded in a solvent to prepare a magnetic paint, and the magnetic paint is coated over the nonmagnetic support. The coating of the magnetic paint over the support can be done by a known coating method such as a reverse roll coating and a spin coating.

The resin component employable for the preparation of the magnetic paint can be selected from those conventionally employed such as thermoplastic resins, thermo-setting resins and heat-reactive resins. Examples of the resin component include vinyl chloride/vinyl acetate copolymer, vinyl chloride/vinyl acetate/vinyl alcohol copolymer, vinyl chloride/vinyl acetate/acrylic acid copolymer, vinylidene chloride/vinyl chloride copolymer, vinyl/chloride/acrylonitrile copolymer, ethylene/vinyl acetate copolymer, vinyl chloride copolymer incorporated with a polar group such as —$SO_3Na$ or —$SO_2Na$ or an epoxy group, cellulose derivatives such as nitrocellulose, acrylic resin, polyvinyl acetal resin, polyvinyl butyral resin, epoxy resin, phenoxy resin, polyester polyurethane resin, polyurethane resin incorporated with a polar group such as —$SO_3Na$ or —$SO_2Na$ or an epoxy group, and polycarbonate polyurethane resin.

In the case of using a curing agent for the preparation of a magnetic paint, a polyisocyanate compound is generally employed as the curing agent. The polyisocyanate compound employable in the invention can be chosen from those conventionally used as a curing agent for polyurethane resins.

In the case of subjecting to the curing treatment the magnetic recording layer by means of irradiation with electron beam, a compound having a reactive double bond (e.g., urethane acrylate) can be employed in the preparation of a magnetic paint.

There is no specific limitation on the ferromagnetic powder employable in the invention. Examples of the ferromagnetic powder include $\gamma$-$Fe_2O_3$, Co-containing $\gamma$-$Fe_2O_3$, $Fe_3O_4$, Co-containing $Fe_3O_4$, $CrO_2$, Co-Ni-P alloy, and Fe-Co-Ni alloy.

The above-mentioned resin component, curing agent and ferromagnetic powder are kneaded and dispersed in a solvent conventionally employed in the preparation of a magnetic paint (e.g., methyl ethyl ketone, dioxane, cyclohexanone or ethyl acetate) to prepare a magnetic paint. Kneading and dispersing those components can be carried out according to a known method.

The magnetic paint may contain other known additives or fillers in addition to the above-mentioned components. Examples of other additives or fillers include those generally employed such as an abrasive (e.g., $\alpha$-$Al_2O_3$ and $Cr_2O_3$), an antistatic agent (e.g., carbon black), a lubricant (e.g., fatty acid, fatty acid ester and silicon oil), and a dispersing agent.

If desired, the nonmagnetic support with a layer of the magnetic paint is then successively subjected to magnetic orientation, a calender treatment and a curing treatment.

The nonmagnetic support having the magnetic recording layer thereon is then punched into a disk having a circular hole in the central portion, to prepare a magnetic recording disk.

Subsequently, the magnetic recording disk having a circular hole in the central portion (i.e., medium sheet) is fitted with mechanical members basically comprising a center core, an upper core and a double-sided adhesive ring (i.e., mechanical members including a center core) in the central hole to produce a magnetic recording disk provided with a center core.

The mechanical members such as a center core, an upper core and a double-sided adhesive ring are made of a synthetic resin. The synthetic resin employable for the preparation of the mechanical members can be chosen from polycarbonate resins, styrene resins such as ABS resin and polystyrene resin, polyacetal resins, and the like.

In the process of the invention, each of the medium sheet and the center core is required to be subjected to a heat treatment independently prior to fitting the mechanical members including a center core to the medium sheet. Preferably, each part of the mechanical members, namely, each of the center core, upper core and double-sided adhesive ring, is subjected to a heat treatment independently.

The heat treatment is preferably carried out under the conditions of a temperature of 50° to 100° C., a humidity of 20 to 80% RH, and a period of 12 to 100 hours, more preferably a temperature of 60° to 90° C., a humidity of 50 to 80% RH, and a period of 48 to 72 hours. If the temperature exceeds 100° C., the surface smoothness of the medium sheet is liable to lower. When the temperature is less than 50° C., enough heating treatment cannot be done.

As for the humidity, a high humidity is favorably employed for reducing the heat shrinkage of the medium sheet or the mechanical members from the viewpoint of synergistic effect with heating. However, if the humidity is too high, that is, if the humidity exceeds 80% RH, dew condensation is easily produced, so that such high humidity is unsuitable for the heat treatment. If the humidity is less than 20% RH, a satisfactory effect cannot be given by the heat treatment.

The medium sheet having been subjected to a heat treatment as described above is fitted with the mechanical members having been also subjected to a heat treatment by placing the center core, double-sided adhesive ring and the upper core, in this order, on the central hole part of the medium sheet and adhering therewith, to prepare a magnetic recording disk having the center core, etc.

An example and acomparison example of the present invention are given below. In the following examples, the expression "part(s)" means "part(s) by weight", otherwise specified.

EXAMPLE 1

The components for a magnetic paint indicated below were homogeneously kneaded in a ball mill to give a magnetic paint.

| | |
|---|---|
| Ferromagnetic metal powder (Fe—Ni alloy, Fe: 96 wt. %, Ni: 4 wt. %, specific surface area: 45 m²g) | 1,000 parts |
| Vinyl chloride/vinyl acetate/maleic anhydride copolymer (400 × 100A, available from Nippon Zeon Co., Ltd., Japan) | 97 parts |
| Polyurethane resin (Niporan N-2304, available from Nippon Polyurethane Co., Ltd., Japan) | 35 parts |
| Polyisocyanate compound (Colonate L, available from Nippon Polyurethane Co., Ltd.) | 75 parts |
| Carbon black (mean particle size: 0.04 μm) | 10 parts |
| $Cr_2O_3$ (mean particle size: 0.33 μm) | 100 parts |
| Amyl stearate | 100 parts |
| Butoxyethyl stearate | 15 parts |
| Methyl ethyl ketone | 1,740 parts |
| Cyclohexanone | 1,160 parts |

The magnetic paint was coated over both surfaces of a polyethylene terephthalate support (thickness: 32 μm) in such a manner that each coated layer of the magnetic paint would have thickness of 4 μm (after dryness).

After the coated layers were dried, the dried layers were sucessively subjected to a calender treatment and a curing treatment. The polyethylene terephthalate support having the magnetic recording layer on both surfaces was the punched into a disk, to prepare a magnetic recording disk having a circular hole of 12 mm-diameter in the central portion (i.e., medium sheet).

Subsequently, the medium sheet, a center core, an upper core and a double-sided adhesive ring were individually vidually heated at a temperature of 60° C. and a humidity of 20% RH for 48 hours. Thereafter, the medium sheet was fitted with the center core, upper core and the double-sided adhesive ring, to prepare a video floppy disk.

COMPARAISON EXAMPLE 1

The procedure of Example 1 was repeated except for heating only the medium sheet at a temperature of 60° C. and a humidity of 20% RH for 48 hours and then fitting the center core, upper core and the double-sided adhesive ring to the medium sheet, to prepare a video floppy disk.

COMPARISON EXAMPLE 2

The procedure of Example 1 was repeated except for fitting the medium sheet with the center core, upper core and the double-sided adhesive ring and then heating the whole parts at a temperature of 60° C. and a humidity of 20% RH for 48 hours, to prepare a video floppy disk.

EXAMPLE 2

The procedure of Example 1 was repeated except for varying the conditions for heating to those of a temperature of 60° C., a humidity of 80% RH and a period of 48 hours, to prepare a video floppy disk.

COMPARAISON EXAMPLE 3

The procedure of Example 1 was repeated except for fitting the medium sheet with the center core, upper core and the double-side adhesive ring and then heating the whole parts at a temperature of 60° C. and a humidity of 80% RH for 48 hours, to prepare a video floppy disk.

EXAMPLE 3

The procedure of Example 1 was repeated except for varying the conditions for heating to those of a temperature of 60° C., a humidity of 80% RH and a period of 72 hours, to prepare a video floppy disk.

EXAMPLE 4

The procedure of Example 1 was repeated except for varying the conditions for heating to those of a temperature of 60° C., a humidity of 80% RH and a period of 72 hours, to prepare a video floppy disk.

EXAMPLE 5

The procedure of Example 1 was repeated except for varying the conditions for heating to those of a temperature of 90° C., a humidity of 80% RH and a period of 72 hours, to prepare a video floppy disk.

EXAMPLE 6

The procedure of Example 1 was repeated except for varying the conditions for heating to those of a temperature of 60° C., a humidity of 50% RH and a period of 72 hours, to prepare a video floppy disk.

The synthetic resin employed for the mechanical members such as a center core was ABS resin only in Example 4 and was polycarbonate in other examples.

The video floppy disks obtained in the abovementioned examples were evaluated on the environmental stability (i.e., increase of skew and tracking deviation) and surface smoothness according to the following tests.

Increase of Skew and Tracking Deviation

After recording a signal on the video floppy disk under the conditions of at a temperature of 23° C. and a humidity of 50% RH, the floppy disk was stored in an atmosphere of a temperature of 60° C. and a humidity of 80% RH for 72 hours. The floppy disk was then allowed to stand at 23° C. and 50% RH for 24 hours to measure increase of skew and tracking deviation.

Surface Smoothness

The video floppy disk was rotated to optically observe the surface smoothness.

The results were classified into the following:
AA: practically available;
BB: some protruded and depressed portions are observed, but practically available; and
CC: not practically available.

The results of the above-described evaluations are set forth in Table 1.

TABLE 1

|  | Environmental Stability | | |
| --- | --- | --- | --- |
|  | Increase of Skew (μsec.) | Tracking Deviation (μm) | Surface Smoothness |
| Example 1 | 0.7 | 20 | BB |
| Com. Ex. 1 | 0.9 | 32 | BB |
| Com. Ex. 2 | 0.7 | 25 | CC |
| Example 2 | 0.3 | 8 | AA |
| Com. Ex. 3 | 0.3 | 10 | CC |
| Example 3 | 0.1 | 5 | AA |
| Example 4 | 0.2 | 7 | AA |
| Example 5 | 0.1 | 5 | AA |
| Example 6 | 0.6 | 18 | AA |

As is evident from the results set forth in Table 1, most of the video floppy disks prepared by the process of the invention (Examples 1 to 6) were excellent in both of skew property and tracking property, that is, the video disks showed a small increase of skew and a low level of tracking deviation without lowering the surface smoothness, although some of them relatively deteriorated in those properties under the conditions of a low temperature and a low humidity.

On the other hand, it was confirmed that the video floppy disk prepared by the process comprising heating only the medium sheet (Comparison Example 1) were unsatisfactory in skew property and tracking property, though the surface smoothness was not spoiled. Also confirmed was that the video disks prepared by the process comprising fitting the mechanical members including a center core to the medium sheet and then heating them (comparison Examples 2 and 3) showed poor surface smoothness and were unable to be practically used, though the skew property and tracking property were relatively good.

We claim:

1. A process for the preparation of a magnetic recording disk comprising the steps of providing a magnetic recording layer on a surface of a nonmagnetic support, punching the nonmagnetic support together with the magnetic recording layer into a disk having a circular hole in the central portion, and fitting mechanical members including a center core made of a synthetic resin into the hole of the support, wherein the nonmagnetic support as provided with the magnetic recording layer and at least the center core of the mechanical members are subjected to heat treatment independently prior to fitting the mechanical members including the center core into the hole of the support.

2. The process as claimed in claim 1, wherein the nonmagnetic support having the magnetic recording layer and each of the mechanical members including the center core are subjected to heat treatment independently.

3. The process as claimed in claim 1, wherein the heat treatment is performed under the conditions of a temperature of 50° to 100° C., a humidity of 20 to 80% RH and a period of 12 to 100 hours.

4. The process as claimed in claim 1, wherein the heat treatment is performed under the conditions of a temperature of 60° to 90° C., a humidity of 50 to 80% RH and a period of 48 to 72 hours.

* * * * *